United States Patent
Koike et al.

(10) Patent No.: US 10,313,119 B2
(45) Date of Patent: Jun. 4, 2019

(54) DATA MANAGEMENT DEVICE, SYSTEM, RE-ENCRYPTION DEVICE, DATA SHARING DEVICE, AND STORAGE MEDIUM

(71) Applicants: Kabushiki Kaisha Toshiba, Minato-ku (JP); TOSHIBA SOLUTIONS CORPORATION, Kawasaki-shi (JP)

(72) Inventors: Masanobu Koike, Tama (JP); Yoshihiro Fujii, Tokyo (JP)

(73) Assignees: KABUSHIKI KAISHA TOSHIBA, Minato-ku (JP); TOSHIBA SOLUTIONS CORPORATION, Kawasaki-shi (JP)

( * ) Notice: Subject to any disclaimer, the term of this patent is extended or adjusted under 35 U.S.C. 154(b) by 332 days.

(21) Appl. No.: 15/258,316

(22) Filed: Sep. 7, 2016

(65) Prior Publication Data
US 2016/0380768 A1    Dec. 29, 2016

Related U.S. Application Data

(63) Continuation of application No. PCT/JP2015/056226, filed on Mar. 3, 2015.

(30) Foreign Application Priority Data

Mar. 7, 2014    (JP) .................. 2014-045610

(51) Int. Cl.
*H04L 9/08* (2006.01)
*H04L 9/30* (2006.01)

(52) U.S. Cl.
CPC .......... *H04L 9/0891* (2013.01); *H04L 9/0897* (2013.01); *H04L 9/30* (2013.01); *H04L 9/3073* (2013.01); *H04L 2209/76* (2013.01)

(58) Field of Classification Search
CPC ... H04L 9/0891; H04L 9/3073; H04L 9/0897; H04L 9/30; H04L 2209/76
(Continued)

(56) References Cited

U.S. PATENT DOCUMENTS

| 5,937,066 A | * | 8/1999 | Gennaro | ............... H04L 9/0841 380/286 |
| 5,940,507 A | * | 8/1999 | Cane | ................... G06F 21/6245 380/277 |
| 5,953,419 A | * | 9/1999 | Lohstroh | ............. G06F 21/6209 380/278 |

FOREIGN PATENT DOCUMENTS

| JP | 2005-252384 | 9/2005 |
| JP | 2009-104445 | 5/2009 |

(Continued)

OTHER PUBLICATIONS

Office Action dated Dec. 20, 2016 in Japanese Patent Application No. 2014-045610 (with English language translation).
(Continued)

*Primary Examiner* — Kambiz Zand
*Assistant Examiner* — Benjamin A Kaplan
(74) *Attorney, Agent, or Firm* — Oblon, McClelland, Maier & Neustadt, L.L.P.

(57) ABSTRACT

A data management device according to an embodiment stores first encrypted data obtained by encrypting plain text data with a first public key of a first user device. The data management device stores a first re-encryption key for re-encrypting the first encrypted data without decrypting to obtain first re-encrypted data decryptable with a private key of a second user device. The data management device stores a conversion key generated from a first private key corresponding to the first public key and a second private key of the first user device. The data management device converts the first encrypted data into second encrypted data with the
(Continued)

conversion key. The data management device The data management device converts the first re-encryption key into a second re-encryption key with the conversion key.

6 Claims, 4 Drawing Sheets

(58) Field of Classification Search
USPC .......................................................... 380/277
See application file for complete search history.

(56) References Cited

FOREIGN PATENT DOCUMENTS

| JP | 2010-130459 | 6/2010 |
|---|---|---|
| JP | 2013-78042 | 4/2013 |
| JP | 2013-101260 | 5/2013 |

OTHER PUBLICATIONS

International Search Report dated Apr. 7, 2015 in PCT/JP2015/056226, filed on Mar. 3, 2015 ( with English translation).
Written Opinion dated Apr. 7, 2015 in PCT/JP2015/056226, filed on Mar. 3, 2015.
Changyu Dong et al. "Longitude: a Privacy-preserving Location Sharing Protocol for Mobile Applications*", Trust Management V, 2011, 16 pages.
Matt Blaze et al "Divertible Protocols and Atomic Proxy Cryptography", Advances in Cryptology, Eurocrypt 98, 1998, 18 pages.
Ryotaro Hayashi et al. "Unforgeability of Re-encryption Keys against Collusion Attack in Proxy Re-Encryption", IWSEC 2011, 20 pages.

* cited by examiner

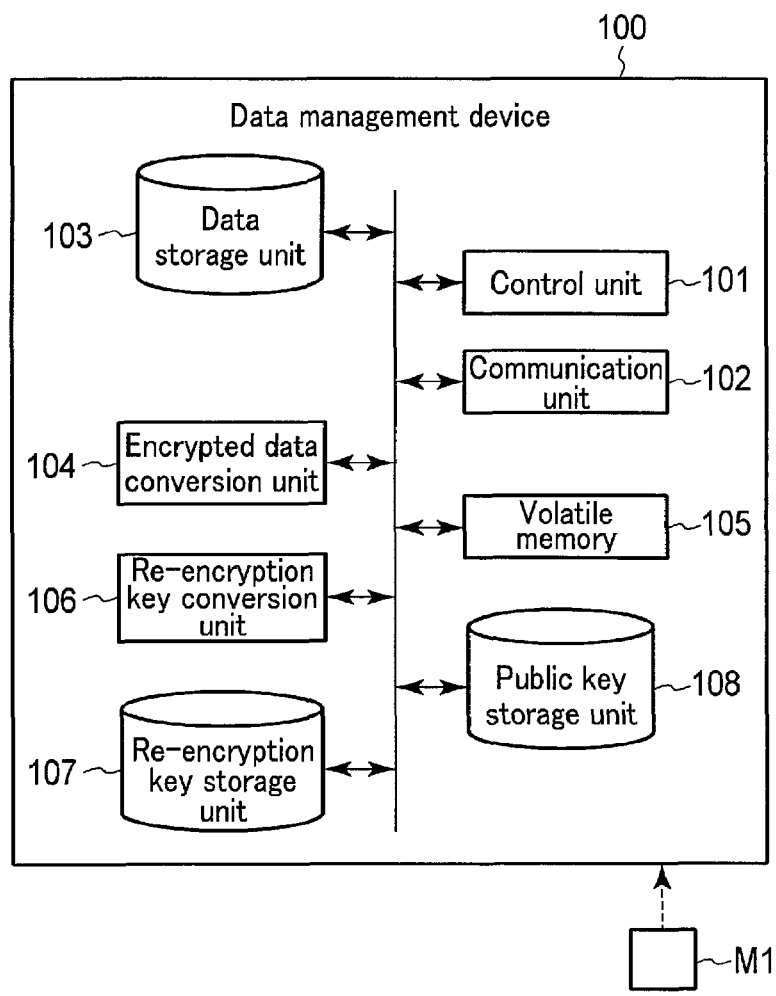
F I G. 1

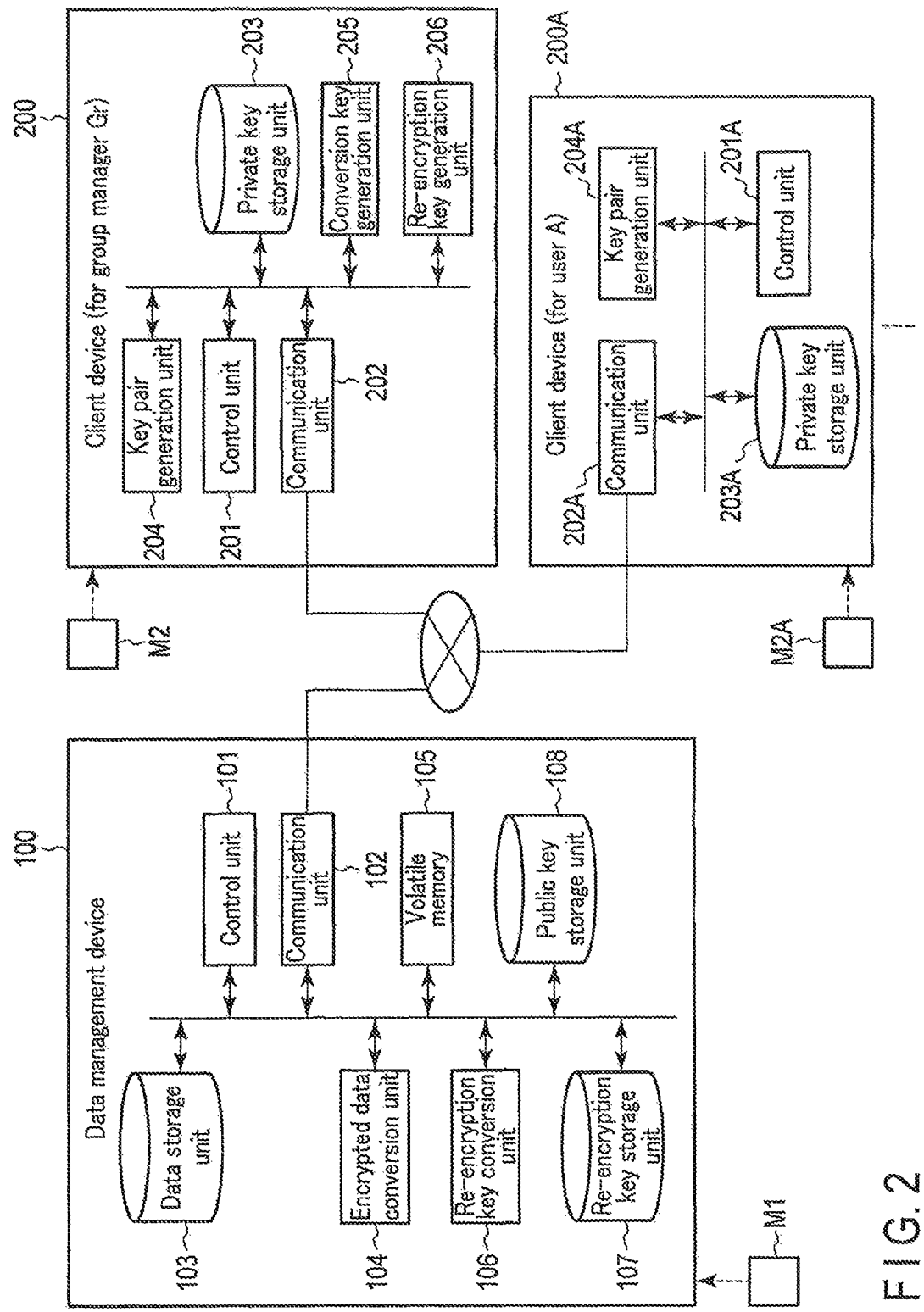
F I G. 2

DATA MANAGEMENT DEVICE, SYSTEM, RE-ENCRYPTION DEVICE, DATA SHARING DEVICE, AND STORAGE MEDIUM

CROSS-REFERENCE TO RELATED APPLICATIONS

This application is a Continuation application of PCT application No. PCT/JP2015/056226, filed on Mar. 3, 2015, and is based upon and claims the benefit of priority from Japanese Patent Application No. 2014-045610, filed on Mar. 7, 2014, the entire contents of which are incorporated herein by reference.

FIELD

Embodiments described herein relate generally to a data management apparatus, system, re-encryption apparatus, data sharing apparatus, and storage medium.

BACKGROUND

A file sharing system in which a user uploads a file to a server device, and the file is shared by a plurality of users has been known. In addition, a method using a proxy re-encryption scheme to keep the shared file secret has been known.

FIG. 4 is a schematic diagram for illustrating the proxy re-encryption scheme. Users A and B of the file sharing system each have a different pair of a private key sk and a public key pk (hereinafter also referred to as a "key pair"). A terminal of user U, who uploads file D to be shared, encrypts file D with a public key (hereinafter referred to as a "group public key") $pk_{Gr}$ of an entity managing a group in which file D is to be shared (hereinafter referred to as a "group manager Gr") (ST1). The encrypted file E ($pk_{Gr}$,D) obtained by the encryption is uploaded from the terminal of user U to a server device 1 (ST2), and stored in the server device 1. The server device 1 may be a cloud storage.

When user A obtains file D stored in the state of encrypted file E ($pk_{Gr}$,D), the server device 1 re-encrypts the encrypted file E ($pk_{Gr}$,D) based on a re-encryption key $rk_{Gr \to A}$ for user A (ST3), and transmits the obtained re-encrypted file E ($pk_A$,D) to (the terminal of) user A (ST4).

The terminal of user A decrypts the received re-encrypted file E ($pk_A$,D) based on a private key $sk_A$ of user A, and obtains file D.

The re-encryption key $rk_{Gr \to A}$ is a key created by the group manager Gr based on a private key $sk_{Gr}$ of the group manager Gr and a public key $pk_A$ of user A. With the re-encryption key $rk_{Gr \to A}$, the encrypted file E for the group manager Gr ($pk_{Gr}$,D) can be converted into the encrypted file E for user A ($pk_A$,D) without being decrypted. Here, Gr, which is the left member of the subscript of the re-encryption key $rk_{Gr \to A}$, is called a "source of conversion," and A, which is the right member of the subscript, is called a "target of conversion." The above explanation applies when "user A" is replaced with "user B," and "A" in the subscript is replaced with "B." Similarly, "file D" may be replaced with "data D."

When an encryption technology is used, a mechanism for updating a key is necessary as preparation for a leak or loss of a key, or developments in cryptographic technology, etc. The same applies to the case where the proxy re-encryption scheme is used.

When user A or B, or the group manager Gr updates a key (key pair) in a file sharing system using the proxy re-encryption scheme, the following measures need to be taken in response to the updating of the key. Referring to the time of updating the key, the key before the update time is called an "old key," and the key after the update time is called a "new key."

(1) Convert data encrypted by the old key to be undecryptable with the old key and decryptable with the new key.

(2) Update the re-encryption key corresponding to the old key.

Measure (1) corresponds to the case where the key ($pk_{Gr}$, $sk_{Gr}$) of the group manager Gr is updated in the example shown in FIG. 4. The encrypted file E ($pk_{Gr}$,D) obtained by encryption with the old group public key $pk_{Gr}$ needs to be undecryptable with the old key ($sk_{Gr}$) of the group manager Gr, and decryptable with the new key ($sk_{Gr}'$). Therefore, a conceivable method is to decrypt once, with the old key $sk_{Gr}$, the encrypted file E ($pk_{Gr}$,D) obtained by encryption with the old key $pk_{Gr}$, and encrypt the obtained file D with the new key ($pk_{Gr}'$).

However, this method can be performed only by a user who can perform decrypting with the old key, i.e., the group manager Gr. Therefore, the group manager Gr needs to download all the encrypted files and decrypt them with the old key, re-encrypt, the obtained files D with the new key, and re-upload them. When the data amount of the encrypted files is huge, this method is not realistic because of inconveniences such as an increased load on the user as the group manager Gr, and an excessive communication time.

Another conceivable method is to use a re-encryption function of the proxy re-encryption scheme to re-encrypt the key that encrypts data from the old key to the new key. The proxy re-encryption scheme is described in non-patent literature 1 (Hayashi, et al., "Unforgeability of Re-Encryption Keys against Collusion Attack in Proxy Re-Encryption", IWSEC 2011, LNCS 7038, pp. 210-229, 2011; hereinafter referred to as "non-patent literature 1"). However, the proxy re-encryption scheme of non-patent literature 1 is a scheme capable of only one re-encryption. Therefore, if a key is re-encrypted by this scheme, the inconvenience of disabling an encrypted file from being re-encrypted or that of disabling a key from being updated twice or more is caused.

Measure (2) includes the case where the key of user A, who is the target of conversion of the re-encryption key, is updated, and the case where the key of the group manager Gr, who is the source of conversion of the re-encryption key, is updated in the example shown in FIG. 4.

In the former case, all the re-encryption keys whose target of conversion is user A need to be re-created based on the new key. In this case, the group manager Gr creates one re-encryption key for user A and re-uploads it to the server. If there is an encryption key for user A from another group which is not shown, the group manager Gr of that group creates one re-encryption key for user A and re-uploads it to the server device 1. Accordingly, each group manager Gr may generate one re-encryption key and re-upload it.

In the latter case, all the re-encryption keys whose source of conversion is the group manager Gr need to be re-created based on the new key. This process can be performed only by a user who has a new private key, i.e., the group manager Gr. Therefore, the group manager Gr needs to re-create all re-encryption keys and re-upload them to the server device 1. If the number of re-encryption keys is large, it causes an inconvenience of placing a burden on the user as the group manager Gr.

Accordingly, the embodiments are intended to provide a data management device, system, re-encryption device, data sharing device, and storage medium that can reduce the load on a user when updating encrypted data and an re-encryption key in accordance with update of a key of the user in a proxy re-encryption scheme.

BRIEF DESCRIPTION OF THE DRAWINGS

FIG. 1 is a schematic diagram showing a configuration of a data management device according to the first embodiment.

FIG. 2 is a schematic diagram showing a configuration of a system using the data management device according to the same embodiment.

DETAILED DESCRIPTION

Figure 3:
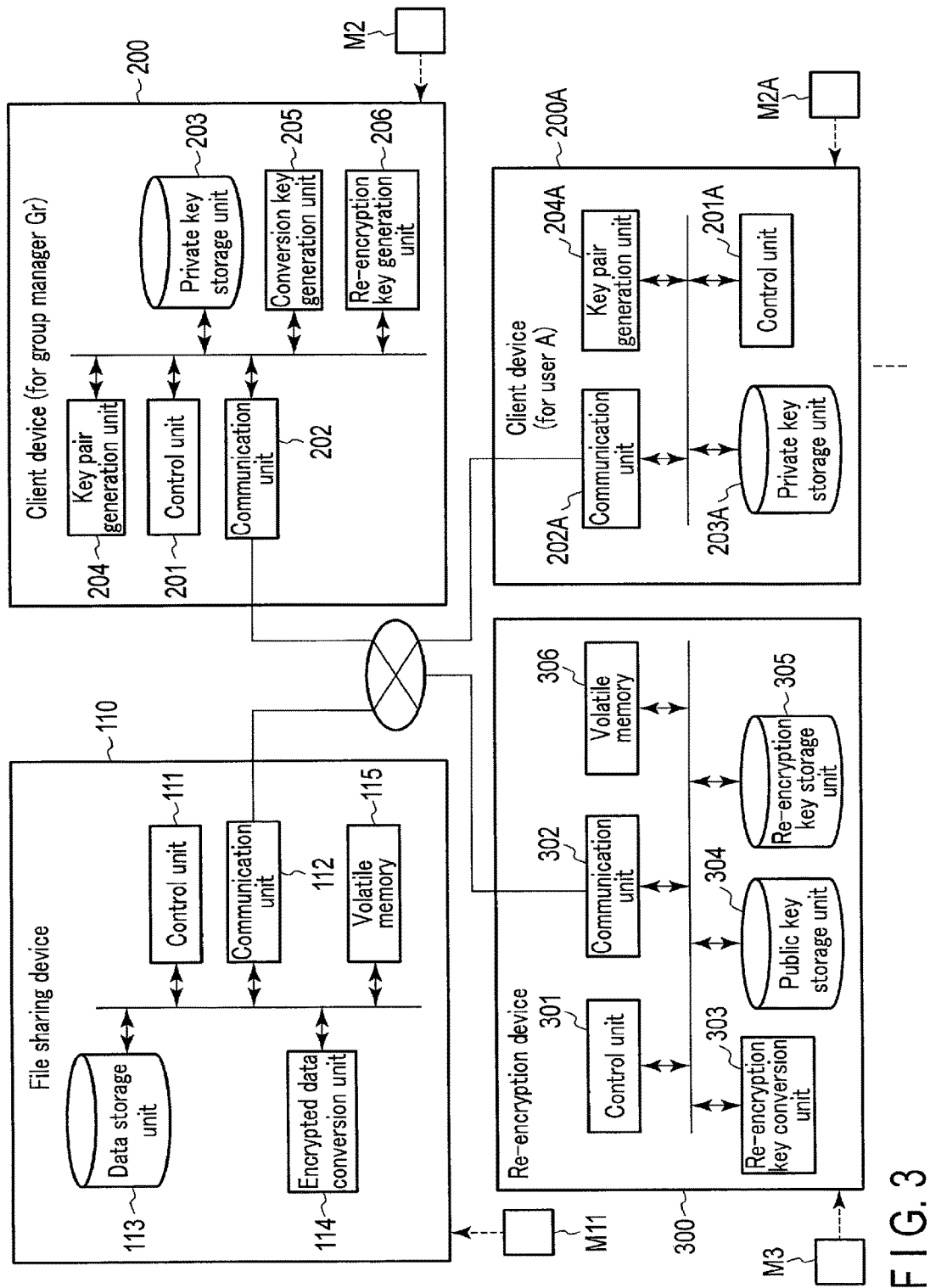
FIG. 3 is a schematic diagram showing a configuration of a system according to the second embodiment.
Figure 4:
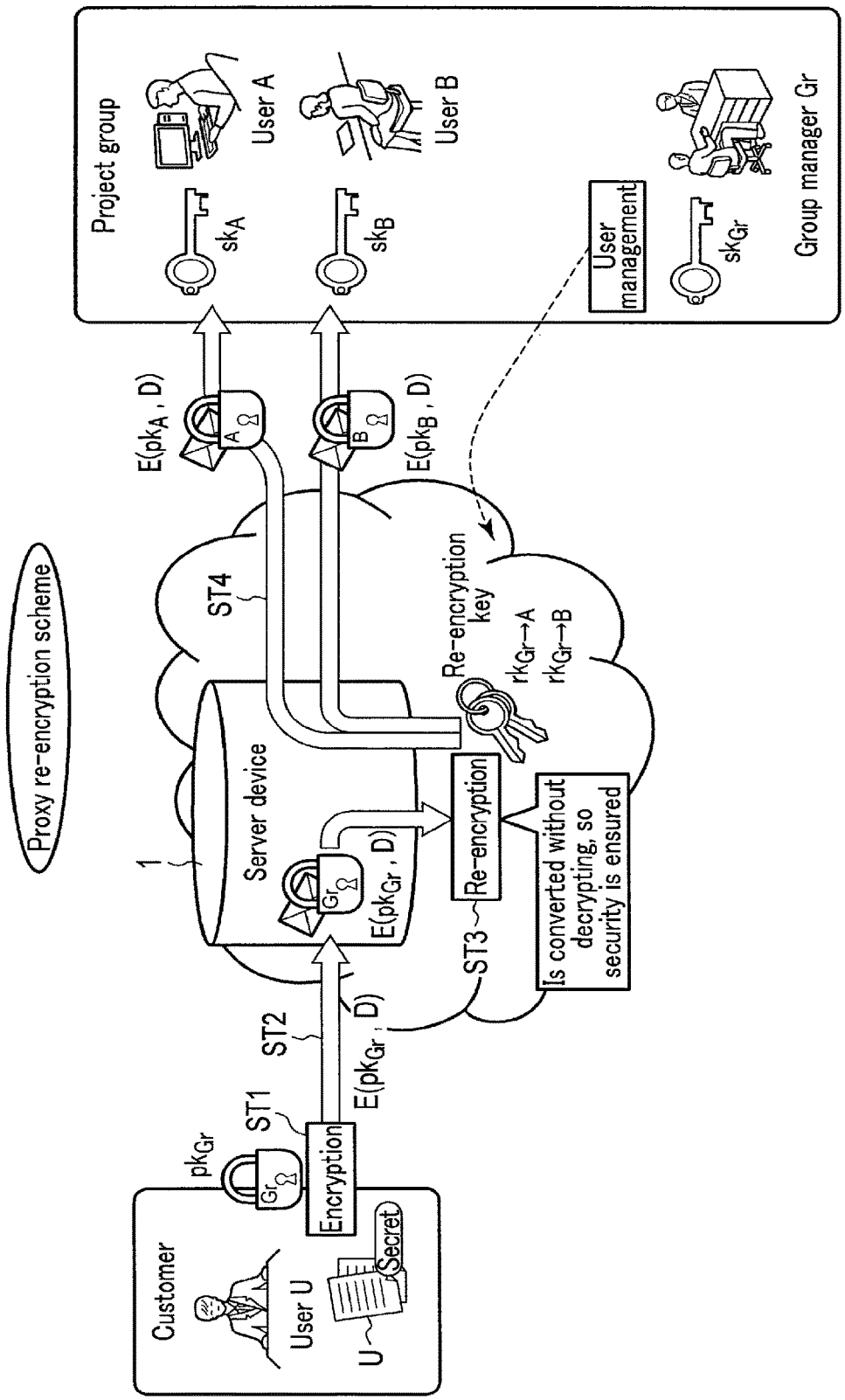
FIG. 4 is a schematic diagram showing a configuration of a file sharing system using a common proxy re-encryption scheme.

In general, according to one embodiment, a data management device manages encrypted data and a re-encryption key.

The data management device includes a first encrypted data storage device, a first re-encryption key storage device, a conversion key storage device, an encrypted data conversion device, a second encrypted data storage device, a re-encryption key conversion device, and a second re-encryption key storage device.

The first encrypted data storage device stores first encrypted data obtained by encrypting plain text data with a first public key of a first user device.

The first re-encryption key storage device stores a first re-encryption key for re-encrypting the first encrypted data without decrypting to obtain first re-encrypted data decryptable with a private key of a second user device.

The conversion key storage device stores a conversion key generated from a first private key corresponding to the first public key and a second private key of the first user device.

The encrypted data conversion device converts the first encrypted data into second encrypted data with the conversion key.

The second encrypted data storage device stores the second encrypted data.

The re-encryption key conversion device converts the first re-encryption key into a second re-encryption key with the conversion key.

The second re-encryption key storage device stores the second re-encryption key.

The second encrypted data is identical to encrypted data obtained by encrypting the plain text data with a second public key corresponding to the second private key.

The second re-encryption key is a re-encryption key for re-encrypting the second encrypted data without decrypting to obtain second re-encrypted data decryptable with the private key of the second user device.

Hereinafter, embodiments will be described with reference to the drawings. Each device described below can be implemented by either a hardware configuration, or a combined configuration of a hardware resource and software. As the software, as shown in, for example, FIGS. 1-3, a program, which is installed in advance from a network or a non-transitory computer-readable storage medium M1, M2, M2A, M11, or M3 in each computer and which causes a processor of each computer to perform a process of the corresponding device, is used.

First Embodiment

FIG. 1 is a schematic diagram showing a configuration of a data management device according to the first embodiment, and FIG. 2 is a schematic diagram showing a configuration of a system to which the data management device of FIG. 1 is applied. This system includes a data management device 100 and a plurality of client devices 200, 200A, . . . and onward. Each client device 200A, . . . , other than the client device 200 of a group manager Gr, has the same functional block configuration. Therefore, the functional block of one client device 200A will be representatively described. Specifically, each client device 200A, . . . , other than client device 200, has a configuration in which the conversion key generation unit 205 and re-encryption key generation unit 206 of the units 201-206 of client device 200 are omitted.

The data management device 100 includes a control unit 101, a communication unit 102, a data storage unit 103, an encrypted data conversion unit 104, a volatile memory 105, a re-encryption key conversion unit 106, a re-encryption key storage unit 107, and a public key storage unit 108. The term of " . . . unit" is also referred to as " . . . circuit" or " . . . circuitry". This is applicable to each of the following embodiments.

The control unit 101 has a function of controlling each unit 102-108.

The communication unit 102 has a function of communicating with client device 200 via the network. Accordingly, the communication unit 102 has a function of writing a conversion key, an encryption key (first re-encryption key), and a public key, which are received from the client device 200 of the group manager Gr, in the volatile memory 105, the re-encryption key storage unit 107 and the public key storage unit 108. Similarly, the communication unit 102 has a function of writing encrypted data (first encrypted data) received from the client device 200A, . . . of each user (A, B, . . . ), and a public key in the data storage unit 103 and the public key storage unit 108.

The data storage unit 103 has a function of storing encrypted data obtained by encrypting plain text data. Specifically, the data storage unit 103 forms a first encrypted data storage device for storing pre-update encrypted data (first encrypted data) obtained by encrypting plain text data with a pre-update public key (first public key) of client device (first user device) 200. The "first user device" means the client device 200 used by the group manager Gr, which is the source of conversion of the re-encryption key. The data storage unit 103 forms a second encrypted data storage device for storing post-update encrypted data (second encrypted data) obtained by the encrypted data conversion unit 104.

The second encrypted data is the same as encrypted data obtained by encrypting plain text data (original data of the first encrypted data) with a post-update public key (second public key) corresponding to a post-update private key (second private key) of client device 200. Namely, the first encrypted data is pre-update encrypted data corresponding to the pre-update first public key and first private key. The second encrypted data is post-update encrypted data corresponding to the post-update second public key and second private key.

The encrypted data conversion unit 104 has a function of converting first encrypted data in the data storage unit 13 into second encrypted data with the conversion key in the volatile memory 105 by being controlled by the control unit 101. The encrypted data conversion unit 103 also has a function of writing the second encrypted data in the data storage unit 103.

The volatile memory 105 has a function of receiving, via the communication unit 102, a conversion key transmitted from client device 200, and storing the conversion key.

The re-encryption key conversion unit 106 has a function of converting a first re-encryption key in the re-encryption key storage unit 107 into a second re-encryption key with the conversion key in the volatile memory 105 by being controlled by the control unit 101. The re-encryption key conversion unit 106 has a function of writing the second re-encryption key in the re-encryption key storage unit 107.

The re-encryption key storage unit 107 has a function of receiving, via the communication unit 102, a re-encryption key transmitted from client device 200 and storing the re-encryption key. Specifically, the re-encryption key storage unit 107 forms a first re-encryption key storage device for storing a first re-encryption key for re-encrypting the first encrypted data without decrypting to obtain first re-encrypted data decryptable with a private key of a second user device. The "second user device" herein means a client device 200A used by a user (e.g., user A), who is the target of conversion of the re-encryption key. The re-encryption key storage unit 107 forms a second re-encryption key storage device for storing a second re-encryption key obtained by the re-encryption key conversion unit 106.

The second re-encryption key is a re-encryption key for re-encrypting second encrypted data without decrypting to obtain second re-encrypted data decryptable with a private key of a client device 200A (second user device). Additionally, the first re-encryption key is a pre-update re-encryption key corresponding to the pre-update first public key. The second re-encryption key is a post-update re-encryption key corresponding to the post-update second public key. Regarding the first re-encryption key and the second re-encryption key, the private key of client device 200A (second user device) has not been updated.

The public key storage unit 108 has a function of receiving, via the communication unit 102, a public key transmitted from a client device 200, 200A, . . . , and storing the public key.

On the other hand, the client device 200 for the group manager Gr includes a control unit 201, a communication unit 202, a private key storage unit 203, a key pair generation unit 204, a conversion key generation unit 205, and a re-encryption key generation unit 206.

The control unit 201 has a function of controlling each unit 202-206.

The communication unit 202 has a function of communicating with the data management device 100 and client device 200A, . . . , via the network.

The private key storage unit 203 stores the private key of the private key and public key included in the key pair generated by the key pair generation unit 204.

The key pair generation unit 204 has a function of generating a key pair of a private key and a public key of client device 200. The private key generated therein is stored in the private key storage unit 203, and the public key is transmitted to the data management device 100 through the communication unit 202.

The conversion key generation unit 205 has a function of, upon updating its own key pair, generating a conversion key for converting encrypted data in the data management device 100 and the re-encryption key in accordance with the updated key pair.

The re-encryption key generation unit 206 has a function of generating a re-encryption key based on its own private key in the private key storage unit 203 and a public key of another user (public key of the second user device) obtained from the data management device 100 through the communication unit 202. The re-encryption key generation unit 206 has a function of transmitting the generated re-encryption key to the data management device 100 through the communication unit 202.

Client device 200A for user A includes a control unit 201A, a communication unit 202A, a private key storage unit 203A, and a key pair generation unit 204A.

The control unit 201A has a function of controlling each unit 202A-204A.

The communication unit 202A has a function of communicating with the data management device 100A and the client device 200, . . . via the network.

The private key storage unit 203A stores the private key of the private key and the public key included in the key pair generated by the key pair generation unit 204A.

The key pair generation unit 204A has a function of generating a key pair of a private key and a public key of client device 200A. The private key generated therein is stored in the private key storage unit 203A, and the public key is transmitted to the data management device 100A through the communication unit 202A.

Next, the operation of the system accordingly configured will be described.

In the first embodiment, the algorithm described in non-patent literature 1 is used as the proxy re-encryption scheme. Therefore, mainly the operation of the case where a key is updated in the proxy re-encryption scheme will be described below. This applies to the subsequent embodiments.

The global parameter $\{p, G, G_T, g, g_1, g_2, u, v, Sig\}$ of the present algorithm is generated in advance by performing a global setup ($\lambda$). The meaning of each symbol is pursuant to that described in non-patent literature 1.

In the global setup ($\lambda$), bilinear map groups (G, $G_T$) satisfying prime order $p>2^\lambda$, generators $g$, $g_1(=g^\alpha)$, $g_2(=g^\beta)$, u, v, $$\xleftarrow{R} G,$$

and a one-time signature scheme (Sig) are selected for security parameter $\lambda$. In accordance with the selection result, the global parameter is determined as par:=$\{p, G, G_T, g, g_1, g_2, u, v, Sig\}$. The message space M is set as $G_T$.

Here, terms relating to the global parameter will be supplementally described.

The group of prime orders q (G, $G_T$) for which bilinear map e: $G \times G \rightarrow G_T$ satisfying the following three conditions (1)-(3) exists is called a "bilinear map group."

(1) bilinearity: $e(g^a, h^b) = e(g,h)^{ab}$ holds for given $(g,h) \in G \times G$ and $a,b \in Z$;

(2) $e(\cdot,\cdot)$ can be efficiently calculated;

(3) non-degeneracy: $e(g,h) \neq 1_{G_T}$ always holds when g, $h \neq 1_G$ does not hold, where Z is a set of integers, and $1_G$ is an identity of G, and $1_{G_T}$ is an identity of $G_T$.

In the one-time signature scheme Sig=(G( ),S( ),V( )), the key generation function G( ) receives security parameter $\lambda$ as an input, and outputs a pair of signature key/validation key (ssk,svk). Regarding a given message M, a signature validation function V(σ,svk,M) returns 1 when the signature based on the signature generation function S( ) is σ=S(ssk, M), and returns 0 in the other cases. Let us assume that an attacker receives the signature σ=S(ssk,M) for one message M (selected by the attacker). When the attacker cannot fabricate the pair (M',σ')≠(M,σ) satisfying V(σ',svk,M')=1 even in this case, Sig is called a "strong one-time signature."

The group manager Gr and each user (user A, user B, etc.), who are users of the file sharing system, generate a key pair at the key pair generator 204 in the respective client devices 200, 200A, . . . . Each client device 200, 200A, . . . transmits the private key of the generated key pair to its own private key storage unit 203, 203A, . . . , and the public key to the data management device 100 through the communication unit 202, 202A, . . . .

The data management device 100 stores the received public key in the public key storage unit 108.

The private key (first private key) of the group manager Gr is $(x_{Gr}, y_{Gr}, z_{Gr})$, and the public key (first public key) thereof is $$(X_{Gr}, Y_{1Gr}, Y_{2Gr}, Z_{Gr}, Z_{1Gr}) = (g^{x_{Gr}}, g_1^{y_{Gr}}, g_2^{y_{Gr}}, g^{z_{Gr}}, g_1^{z_{Gr}}).$$

The private key of user A is $(x_A, y_A, z_A)$, and the public key thereof is $$(X_A, Y_{1A}, Y_{2A}, Z_A, Z_{1A}) = (g^{x_A}, g_1^{y_A}, g_2^{y_A}, g^{z_A}, g_1^{z_A}).$$

The key pair of another user takes similar forms. Each element of the private key is a random element selected from $(Z/pZ)^x$, as described in non-patent literature 1. $(Z/pZ)^x$ is a set of integers relatively prime to $Z_p$ and p, and may be called a multiplicative group $Z_p^x$ relative to p. $Z_p$ is a set (=Z/pZ) of integers equal to or greater than 0 and smaller than p.

The data storage unit 103 of the data management device 100 stores encrypted data $c_i = E_{Gr}(m_i)$ obtained by encrypting plain text data $m_i$ to be protected with the public key of the group manager Gr. The encrypted data is a second level cipher that can be re-encrypted once. Specifically, the encrypted data $c_i$ is represented by the following formula:

$$c_i = (C_{1i}, C_{2Xi}, C_{2Yi}, C_{2Zi}, C_{2Z1i}, C_{3i}, C_{4i}, \sigma_i) = (svk_i, X_{Gr}^{r_i}, Y_{1Gr}^{r_i}, Z_{Gr}^{r_i}, Z_{1Gr}^{r_i}, e(g_1g_2,g)^{r_i} \cdot m_i, (u^{svk_i} \cdot v)^{r_i}, S(ssk_i, (C_{3i}, C_{4i}))),$$

where the meaning of each symbol is pursuant to that described in non-patent literature 1, and random number $r_i$ differs for each plain text data $m_i$.

Furthermore, in the client device 200 of the group manager Gr, the re-encryption key generation unit 206 generates a re-encryption key (first re-encryption key) for user A, for which sharing of the encrypted data is permitted. Re-encryption key Gr→A, whose source of conversion is Gr, and target of conversion is A, is generated as represented by the following formula based on the private key of the group manager Gr, the public key of user A, and random number $\gamma_A$.

$$(R_{GrA1}, R_{GrA2}, R_{GrA3}) = ((X_A \cdot g^{\gamma_A})^{1/x_{Gr}}, (Y_{2A} \cdot g^{\gamma_A})^{1/y_{Gr}}, (X_A \cdot Y_{2A} \cdot g^{\gamma_A})^{1/z_{Gr}})$$

The random number $\gamma_A$ differs for each re-encryption key.

The client device 200 of the group manager Gr transmits the generated re-encryption key to the data management device 100 through the communication unit 202.

The data management device 100 stores the received re-encryption key in the re-encryption key storage unit 107. Namely, the re-encryption key storage unit 107 stores a pre-update first re-encryption key.

The flow of the process of the first embodiment performed when the keys of the group manager Gr needs to be updated in this situation will be described with reference to FIG. 2.

The client device 200 of the group manager Gr generates a new key pair in the key pair generation unit 204. The generated private key (second private key) is $(x_{Gr\_new}, y_{Gr\_new}, z_{Gr\_new})$, and the public key (second public key) is $$(X_{Gr\_new}, Y_{1Gr\_new}, Y_{2Gr\_new}, Z_{Gr\_new}, Z_{1Gr\_new}) = (g^{x_{Gr\_new}}, g_1^{y_{Gr\_new}}, g_2^{y_{Gr\_new}}, g^{z_{Gr\_new}}, g_1^{z_{Gr\_new}}).$$

The generated private key (second private key) is stored in the private key storage unit 203.

In the client device 200 of the group manager Gr, the conversion key generation unit 205 reads out a previous private key $(x_{Gr}, y_{Gr}, z_{Gr})$ and a newly-generated private key $(x_{Gr\_new}, y_{Gr\_new}, z_{Gr\_new})$ from the private key storage unit 203. Private key $(x_{Gr}, y_{Gr}, z_{Gr})$ is a pre-update first private key, and private key $(x_{Gr\_new}, y_{Gr\_new}, z_{Gr\_new})$ is a post-update second private key.

The conversion key generation unit 205 generates the following conversion key based on the first private key and the second private key:

$$(x_{trans}, y_{trans}, z_{trans}) = (x_{Gr\_new}/x_{Gr}, y_{Gr\_new}/y_{Gr}, z_{Gr\_new}/z_{Gr}).$$

The client device 200 of the group manager Gr transmits the generated conversion key to the data management device 100 through the communication unit 202.

The data management device 100 stores, in the volatile memory 105, the conversion key received via the communication unit 102.

The encrypted data conversion unit 104 in the data management device 100 reads, from the data storage unit 103, first encrypted data $E_{Gr}(m_i)$ obtained by encryption with the key of the group manager Gr.

The encrypted data conversion unit 104 converts the first encrypted data $c_i = E_{Gr}(m_i)$ into second encrypted data $c_{i\_new} = (C_{1i\_new}, C_{2Xi\_new}, C_{2Yi\_new}, C_{2Zi\_new}, C_{2Z1i\_new}, C_{3i\_new}, C_{4i\_new}, \sigma_{i\_new})$ as shown below based on the conversion key in the volatile memory 105, and stores the second encrypted data in the data storage unit 103.

$$C_{1i\_new} = C_{1i}$$

$$C_{2Xi\_new} = (C_{2Xi})^{x_{trans}}$$

$$C_{2Yi\_new} = (C_{2Yi})^{y_{trans}}$$

$$C_{2Zi\_new} = (C_{2Zi})^{z_{trans}}$$

$$C_{2Z1i\_new} = (C_{2Z1\_i})^{z_{trans}}$$

$$C_{3i\_new} = C_{3i}$$

$$C_{4i\_new} = C_{4i}$$

$$\sigma_{i\_new} = \sigma_i$$

Similarly, the data management device 100 converts all first encrypted data obtained by encryption with the key of the group manager Or into second encrypted data with the conversion key.

The re-encryption key conversion unit 106 in the data management device 100 reads, from the re-encryption key storage unit 107, a re-encryption key $(R_{GrA1}, R_{GrA2}, R_{GrA3})$, whose source of conversion is the key of the group manager Gr.

The re-encryption key conversion unit 106 converts the re-encryption key $(R_{GrA1}, R_{GrA2}, R_{GrA3})$ into a second re-encryption key ($R_{GrA1\_new}, R_{GrA2\_new}, R_{GrA3\_new}$) as shown below based on the conversion key in the volatile memory 105, and stores the second re-encryption key in the re-encryption key storage unit 107.

$$R_{GrA1\_new} = (R_{GrA1})^{xtrans^{-1}\{-1\}}$$

$$R_{GrA2\_new} = (R_{GrA2})^{ytrans^{-1}\{-1\}}$$

$$R_{GrA3\_new} = (R_{GrA3})^{ztrans^{-1}\{-1\}}$$

The following formulas can confirm that the second encrypted data is a second level cipher based on a new public key in the above step:

$$C_{1i\_new} = C_{1i} = svk_i$$

$$C_{2Xi\_new} = (C_{2Xi})^{xtrans} = (X_{Gr}^{ri})^{xtrans} = ((g^{xGr})^{ri})^{xGr\_new/xGr} = (g^{xGr\_new})^{ri} = X_{Gr\_new}^{ri}$$

$$C_{2Yi\_new} = (C_{2Yi})^{ytrans} = (Y_{1Gr}^{ri})^{ytrans} = ((g_1^{yGr})^{ri})^{yGr\_new/yGr} = (g_1^{yGr\_new})^{ri} = Y_{1Gr\_new}^{ri}$$

$$C_{2Zi\_new} = (C_{2Zi})^{ztrans} = (Z_{Gr}^{ri})^{ztrans} = ((g^{zGr})^{ri})^{zGr\_new/zGr} = (g^{zGr\_new})^{ri} = Z_{Gr\_new}^{ri}$$

$$C_{2Z1i\_new} = (C^{2Z1i})^{ztrans} = (Z_{1Gr}^{ri})^{ztrans} = ((g_1^{zGr})^{ri})^{zGr\_new/zGr} = (g_1^{zGr\_new})^{ri} = Z_{1Gr\_new}^{ri}$$

$$C_{3i\_new} = C_{3i} = e(g_1 g_2, g)^{ri} \cdot m_i$$

$$C_{4i\_new} = C_{4i} = (u^{svki} \cdot v)^{ri}$$

$$\sigma_{i\_new} = \sigma_i = S(ssk_i, (C_{3i}, C_{4i}))$$

Accordingly, the second encrypted data is a second level cipher obtained by encryption with a new public key of the group manager Gr.

Similarly, the following formulas can confirm that the second re-encryption key is a re-encryption key corresponding to the new private key of the group manager Gr:

$$R_{GrA1_{new}} = (R_{GrA1})^{xtrans^{-1}\{-1\}} = ((X_A \cdot g^{yA})^{1/xGr})^{xtrans^{-1}\{-1\}} = ((X_A \cdot g^{yA})^{1/xGr})^{xGr/xGr\_new} = (X_A \cdot g^{yA})^{1/xGr\_new}$$

$$R_{GrA2_{new}} = (R_{GrA2})^{ytrans^{-1}\{-1\}} = Y_{2A} \cdot g^{yA})^{1/yGr})^{ytrans^{-1}\{-1\}} = ((Y_{2A} \cdot g^{yA})^{1/yGr})^{yGr/yGr\_new} = (Y_{2A} \cdot g^{yA})^{1/yGr\_new}$$

$$R_{GrA3_{new}} = (R_{GrA3})^{ztrans^{-1}\{-1\}} = ((X_A \cdot Y_{2A} \cdot g^{yA})^{1/zGr})^{ztrans^{-1}\{-1\}} = ((X_A \cdot Y_{2A} \cdot g^{yA})^{1/zGr})^{zGr/zGr\_new} = (X_A \cdot Y_{2A} \cdot g^{yA})^{1/zGr\_new}$$

Accordingly, the second re-encryption key is a re-encryption key directed from the group manager Gr to user A corresponding to the new private key of the group manager Gr.

According to the present embodiment, as described above, a conversion key generated from a first private key and a second private key is stored, first encrypted data is converted into second encrypted data with the conversion key, and a first re-encryption key is converted into a second re-encryption key with the conversion key.

Accordingly, the load on the user can be reduced when updating encrypted data and an re-encryption key in accordance with update of a key of a user in a proxy re-encryption scheme.

Additionally, when the key pair of the group manager Gr is updated, old first encrypted data in the data management device 100 can be converted with a conversion key so that the old first encrypted data cannot be decrypted by the old first private key, but can be decrypted by the new second private key, and the conversion processing can be performed in the data management device 100. Therefore, the operation in which the group manager Gr downloads first encrypted data, decrypts the first encrypted data with the old first private key, re-encrypts the decrypted data with the new second public key and uploads the re-encrypted data can be omitted, and the load on the user as the group manager Gr can be reduced. In addition, since neither the old first private key nor the new second private key of the group manager Gr can be obtained from the conversion key, the conversion processing can be safely performed on the data management device 100.

Similarly, since the process of converting the first re-encryption key into the second re-encryption key can be safely performed on the data management device 100, the load on the user as the group manager Gr can be reduced.

The converted second encrypted data and second re-encryption key can be continuously used in the file sharing system using the conventional proxy re-encryption scheme.

In the present embodiment, the second private key/first private key is defined as a conversion key, encrypted data is converted using the conversion key as the exponent, and a re-encryption key is converted using the reciprocal of the conversion key as the exponent, as an example.

However, the present embodiment is not limited to the above, and may be modified in such a manner that the second private key/first private key is defined as a conversion key, encrypted data is converted using the reciprocal of the conversion key as the exponent, and a re-encryption key is converted using the conversion key as the exponent. This applies to the subsequent embodiments.

Second Embodiment

FIG. 3 is a schematic diagram showing a configuration of a system according to the second embodiment. The same parts as those in FIG. 2 are assigned with the same numerals and detailed descriptions thereof are omitted, while mainly those parts that are different are described.

The second embodiment is a modification of the first embodiment. In the second embodiment, the data management device 100 shown in FIG. 2 is replaced with the file sharing device 110 and the re-encryption device 300 as shown in FIG. 3. As described above, each client device 200A, . . . , other than the client device 200 of the group manager Gr, has a configuration in which the conversion key generation unit 205 and re-encryption key generation unit 206 of the units 201-206 of client device 200 are omitted.

The file sharing device 110, client devices 200, 200A, . . . , and the re-encryption device 300 can communicate one another.

The file sharing device (data sharing device) 110 has a function relating to encrypted data of the above-described functions of the data management device 100.

Specifically, the data storage device 110 has a function of storing first encrypted data obtained by encrypting plain text data with the first public key of the client device (first user device) 200 of the group manager Gr. The file sharing device 110 also has a function of storing a conversion key generated from a first private key corresponding to the first public key and a second private key of the first user device, converting first encrypted data into second encrypted data with the conversion key, and storing the second encrypted data.

Specifically, the file sharing device 110 includes a control unit 111, a communication unit 112, a data storage unit 113, an encrypted data conversion unit 114, and a volatile memory 115.

The control unit 111 has a function of controlling each unit 112-115.

The communication unit 112 has a function of communicating with each client device 200, 200A, . . . , and the re-encryption device 300 via the network. The communication unit 112 has a function of writing a conversion key received from the client device 200 of the group manager Gr in the volatile memory 115. Similarly, the communication unit 112 has a function of writing encrypted data (first encrypted data) received from the client device 200A, . . . of each user (A, B, . . . ) in the data storage unit 113.

Data storage unit 113 has the same function as the above-described data storage unit 103.

Encrypted data conversion unit 114 has the same function as the above-described encrypted data conversion unit 104.

Volatile memory 115 has the same function as the above-described volatile memory 105.

Each client device 200, 200A, . . . has a function of communicating with the re-encryption device 300 as well as the above-described functions.

The re-encryption device 300 has a function relating to the re-encryption key of the above-described functions of the data management device 100.

Specifically, the re-encryption device 300 has a function of storing a first encrypted key for re-encrypting first encrypted data without decrypting to obtain first re-encrypted data decryptable with a private key of client device 200A (second user device) of the user of the target of conversion (e.g., user A), storing a conversion key, converting a first re-encryption key into a second re-encryption key with the conversion key, and storing the second re-encryption key.

Specifically, the re-encryption device 300 includes a control unit 301, a communication unit 302, a re-encryption key conversion unit 303, a re-encryption key storage unit 305, and a volatile memory 306.

The control unit 301 has a function of controlling each unit 302-306.

The communication unit 302 has a function of communicating with the file sharing device 110 and each client device 200, 200A, . . . via the network. The communication unit 302 also has a function of writing a conversion key, re-encryption key (first re-encryption key), and public key received from the client device 200 of the group manager Gr in the volatile memory 306, the re-encryption key storage unit 305, and the public key storage unit 304. Similarly, the communication unit 302 has a function of writing a public key received from the client device 200A, . . . of each user (A, B, . . . ) in the public key storage unit 304.

Re-encryption key conversion unit 303 has the same function as the above-described re-encryption key conversion unit 106. Specifically, the re-encryption key conversion unit 303 has a function of converting a first re-encryption key in the re-encryption key storage unit 305 into a second re-encryption key with a conversion key in the volatile memory 306 by being controlled by the control unit 301. The re-encryption key conversion unit 303 has a function of writing the second re-encryption key in the re-encryption key storage unit 305.

Publication key storage unit 304 has a function similar to that of the above-described publication key storage unit 108. Specifically, the public key storage unit 304 has a function of receiving, via the communication unit 302, a public key transmitted from each client device 200, 200A, . . . , and storing the public key.

Re-encryption key storage unit 305 has the same function as the above-described re-encryption key storage unit 107. Specifically, the re-encryption key storage unit 305 has a function of receiving, via the communication unit 302, a re-encryption key transmitted from client device 200 and storing the re-encryption key. Specifically, the re-encryption key storage unit 305 forms a first re-encryption key storage device for storing a first re-encryption key for re-encrypting the first encrypted data without decrypting to obtain first re-encrypted data decryptable with a private key of the client device 200A (second user device) of the user of the target of conversion (e.g., user A). The re-encryption key storage unit 305 forms a second re-encryption key storage device for storing a second re-encryption key obtained by the re-encryption key conversion unit 303.

The second re-encryption key is a re-encryption key for re-encrypting second encrypted data without decrypting to obtain second re-encrypted data decryptable with a private key of a client device 200A (second user device). Additionally, the first re-encryption key is a pre-update re-encryption key corresponding to a pre-update first public key. The second re-encryption key is a post-update re-encryption key corresponding to a post-update second public key. The private key of client device 200A (second user device) used for generation of the first re-encryption key and the second re-encryption key has not been updated.

The volatile memory 306 has a function of receiving, via the communication unit 302, a conversion key transmitted from client device 200, and storing the conversion key.

Next, the operation of the system accordingly configured will be described. In the second embodiment, the functions of the data management device 100 described in the first embodiment are distributed among the file sharing device 110 and the re-encryption device 300. Therefore, each key and data used in the second embodiment are the same as those used in the first embodiment. Thus, the redundant description of the formula of each key or data will be omitted in the following explanation.

In the second embodiment, the algorithm described in non-patent literature 1 is used as the proxy re-encryption scheme as in the first embodiment.

The global parameter $\{p, G, G_T, g, g_1, g_2, u, v, Sig\}$ of the algorithm is generated in advance. The meaning of each symbol is the same as that in the first embodiment.

The group manager Gr and each user (user A, user B etc.), who are users of the file sharing system, generate a key pair at the key pair generation units 204 in the respective client devices 200, 200A, . . . . Each client device 200, 200A, . . . transmits the private key of the generated key pair to its own private key storage unit 203, and the public key to the data management device 300 through the communication unit 202.

The re-encryption device 300 stores the received public key in the public key storage unit 304.

The private key (first private key) and public key (first public key) of the group manager Gr are expressed by the same formulas as those in the first embodiment.

The private key and public key of user A are expressed by the same formulas as those in the first embodiment.

The key pair of another user takes similar forms. Each element of the private key is as described in the first embodiment.

The data storage unit 113 of the data sharing device 110 stores, in advance, encrypted data $c_i = E_{Gr}(m_i)$ obtained by encrypting plain text data $m_i$ to be protected with the public key of the group manager Gr. The encrypted data is a second level cipher that can be re-encrypted once. The specific encrypted data is expressed by the same formula as that in the first embodiment.

Furthermore, in the client device 200 of the group manager Gr, the re-encryption key generation unit 206 generates a re-encryption key (first re-encryption key) for user A, for whom sharing of the encrypted data is permitted. Re-encryption key Gr→A, whose source of conversion is Gr, and target of conversion is A, is generated based on the private key of the group manager Gr, the public key of user A, and random number $\gamma_A$. The re-encryption key Gr→A is expressed by the same formula as that in the first embodiment.

The client device 200 of the group manager Gr transmits the generated re-encryption key to the re-encryption device 300 through the communication unit 202.

The re-encryption device 300 stores the received re-encryption key in the re-encryption key storage unit 305. Namely, the re-encryption key storage unit 305 stores a pre-update first re-encryption key.

The flow of the process of the second embodiment performed when the keys of the group manager Gr need to be updated in this situation will be described with reference to FIG. 3.

The client device 200 of the group manager Gr generates a new key pair in the key pair generation unit 204. The generated private key (second private key) and public key (second public key) are the same as those in the first embodiment. The generated private key (second private key) is stored in the private key storage unit 203.

In the client device 200 of the group manager Gr, the conversion key generation unit 205 reads a previous private key (first private key) and a newly-generated private key (second private key) from the private key storage unit 203.

The conversion key generation unit 205 generates a conversion key based on the first private key and the second private key. The conversion key is expressed by the same formula as that in the first embodiment.

The client device 200 of the group manager Gr transmits the generated conversion key to the file sharing device 110 and the re-encryption device 300 via the communication unit 202.

The file sharing device 110 stores the conversion key received via the communication unit 112 in the volatile memory 115.

The encrypted data conversion unit 114 in the file sharing device 110 reads, from the data storage unit 113, first encrypted data $E_{Gr}(m_i)$ obtained by encryption with the key of the group manager Gr.

The encrypted data conversion unit 104 converts the first encrypted data $E_{Gr}(m_i)$ into second encrypted data based on a conversion key in the volatile memory 115, and stores the second encrypted data in the data storage unit 113. The second encrypted data is expressed by the same formula as that in the first embodiment.

Similarly, the file sharing device 110 converts all first encrypted data obtained by encryption with the key of the group manager Gr into second encrypted data with the conversion key.

In contrast, the re-encryption device 300 receives a conversion key from client device 200 via the communication unit 302, and stores it in the volatile memory 306.

The re-encryption key conversion unit 303 in the re-encryption device 300 reads, from the re-encryption key storage unit 305, a re-encryption key ($R_{GrA1}, R_{GrA2}, R_{GrA3}$), whose source of conversion is the key of the group manager Gr.

The re-encryption key conversion unit 303 converts the re-encryption key (first re-encryption key) into a new re-encryption key (second re-encryption key) based on a conversion key in the volatile memory 306, and stores the converted re-encryption key in the re-encryption key storage unit 305. The conversion key, the first re-encryption key, and the second re-encryption key are each expressed by the same formula as that in the first embodiment.

The same formulas as those in the first embodiment can confirm that the second encrypted data is a second level cipher based on a new public key in the above step.

Accordingly, the second encrypted data is a second level cipher obtained by encryption with a new public key of the group manager Gr.

Similarly, the same formulas as those in the first embodiment can confirm that the second re-encryption key is a re-encryption key corresponding to the new private key of the group manager Gr.

Accordingly, the second re-encryption key is a re-encryption key directed from the group manager Gr to user A corresponding to the new private key of the group manager Gr.

As described above, according to the present embodiment, the file sharing device 110 and the re-encryption device 300 store a conversion key generated from the first private key and the second private key. The file sharing device 110 converts first encrypted data into second encrypted data with the conversion key. The re-encryption device 300 converts a first re-encryption key into a second re-encryption key with the conversion key.

Accordingly, the configuration in which the file sharing device 110 converts encrypted data, and the re-encryption device 300 converts a re-encryption key can also perform the same advantage as that performed in the first embodiment.

According to at least one of the above-described embodiments, a conversion key generated from a first private key and a second private key is stored, first encrypted data is converted into second encrypted data with the conversion key, and a first re-encryption key is converted into a second re-encryption key with the conversion key.

Therefore, the load on the user can be reduced when updating encrypted data and an re-encryption key in accordance with update of keys of a user in a proxy re-encryption scheme.

The method described in each embodiment can also be stored in a storage medium such as a magnetic disk (Floppy™ disk, hard disk, or the like), an optical disk (CD-ROM, DVD, or the like), a magneto-optical disk (MO), or a semiconductor memory as a program which can be executed by a computer and distributed.

As the storage medium, any configuration which is a computer-readable storage medium in which a program can be stored may be used regardless of a storage format.

An OS (operating system) which operates on a computer on the basis of an instruction of a program installed from the storage medium in the computer, database management software, and MW (middleware) such as network software may execute a part of the processes to realize the embodiment.

Furthermore, the storage medium according to the embodiment includes not only a medium independent of a computer but also a storage medium in which a program transmitted through a LAN, the Internet, or the like is downloaded and stored or temporarily stored.

The number of storage media is not limited to one. A case in which the process in each embodiment is executed from a plurality of media is included in the storage medium according to the present invention. Any medium configuration may be used.

A computer according to each embodiment is to execute the processes in each of the embodiments on the basis of the program stored in a storage medium. The computer may have any configuration such as one apparatus constituted by a personal computer or a system in which a plurality of apparatuses are connected by a network.

A computer in each embodiment includes not only a personal computer but also an arithmetic processing apparatus, a microcomputer, or the like included in an information processing apparatus. The computer is a generic name of an apparatus and a device which can realize the functions of the present invention by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A data management device that manages encrypted data and a re-encryption key, the data management device comprising:
    a first encrypted data storage device for storing first encrypted data obtained by encrypting plain text data with a first public key of a first user device;
    a first re-encryption key storage device for storing a first re-encryption key for re-encrypting the first encrypted data without decrypting to obtain first re-encrypted data decryptable with a private key of a second user device;
    a conversion key storage device for storing a conversion key generated from a first private key corresponding to the first public key and a second private key of the first user device;
    an encrypted data conversion device for converting the first encrypted data into second encrypted data with the conversion key;
    a second encrypted data storage device for storing the second encrypted data;
    a re-encryption key conversion device for converting the first re-encryption key into a second re-encryption key with the conversion key; and
    a second re-encryption key storage device for storing the second re-encryption key,
    wherein the second encrypted data is identical to encrypted data obtained by encrypting the plain text data with a second public key corresponding to the second private key, and
    the second re-encryption key is a re-encryption key for re-encrypting the second encrypted data without decrypting to obtain second re-encrypted data decryptable with the private key of the second user device.

2. A system comprising a data sharing device and a re-encryption device,
    the data sharing device comprising:
    a first encrypted data storage device for storing first encrypted data obtained by encrypting plain text data with a first public key of a first user device;
    a first conversion key storage device for storing a conversion key generated from a first private key corresponding to the first public key and a second private key of the first user device;
    an encrypted data conversion device for converting the first encrypted data into second encrypted data with the conversion key;
    a second encrypted data storage device for storing the second encrypted data, and
    the re-encryption device comprising:
    a first re-encryption key storage device for storing a first re-encryption key for re-encrypting the first encrypted data without decrypting to obtain first re-encrypted data decryptable with a private key of a second user device;
    a second conversion key storage device for storing the conversion key;
    a re-encryption key conversion device for converting the first re-encryption key into a second re-encryption key with the conversion key in the second conversion key storage device; and
    a second re-encryption key storage device for storing the second re-encryption key,
    wherein the second encrypted data is identical to encrypted data obtained by encrypting the plain text data with a second public key corresponding to the second private key, and
    the second re-encryption key is a re-encryption key for re-encrypting the second encrypted data without decrypting to obtain second re-encrypted data decryptable with the private key of the second user device.

3. A re-encryption device configured to communicate with a data sharing device that stores first encrypted data obtained by encrypting plain text data with a first public key of a first user device,
    the data sharing device also being a device that stores a conversion key generated from a first private key corresponding to the first public key and a second private key of the first user device, converts the first encrypted data into second encrypted data with the conversion key, and stores the second encrypted data, and comprising:
    a first re-encryption key storage device for storing a first re-encryption key for re-encrypting the first encrypted data without decrypting to obtain first re-encrypted data decryptable with a private key of a second user device;
    a second conversion key storage device for storing the conversion key;
    a re-encryption key conversion device for converting the first re-encryption key into a second re-encryption key with the conversion key in the second conversion key storage device; and
    a second re-encryption key storage device for storing the second re-encryption key,
    wherein the second encrypted data is identical to encrypted data obtained by encrypting the plain text data with a second public key corresponding to the second private key, and
    the second re-encryption key is a re-encryption key for re-encrypting the second encrypted data without decrypting to obtain second re-encrypted data decryptable with the private key of the second user device.

4. A data sharing device configured to communicate with a re-encryption device, the data sharing device comprising:
    a first encrypted data storage device for storing first encrypted data obtained by encrypting plain text data with a first public key of a first user device;
    a first conversion key storage device for storing a conversion key generated from a first private key corresponding to the first public key and a second private key of the first user device;
    an encrypted data conversion device for converting the first encrypted data into second encrypted data with the conversion key;

a second encrypted data storage device for storing the second encrypted data, wherein the re-encryption device is configured to store a first re-encryption key for re-encrypting the first encrypted data without decrypting and obtaining first re-encrypted data decryptable with a private key of a second user device, store the conversion key, convert the first re-encryption key into a second re-encryption key with the conversion key, and store the second re-encryption key, the second encrypted data is identical to encrypted data obtained by encrypting the plain text data with a second public key corresponding to the second private key, and the second re-encryption key is a re-encryption key for re-encrypting the second encrypted data without decrypting to obtain second re-encrypted data decryptable with the private key of the second user device.

5. A non-transitory computer readable storage medium storing a program to cause a processor to perform processing, the program which is used by a re-encryption device configured to communicate with a data sharing device that stores first encrypted data obtained by encrypting plain text data with a first public key of a first user device, the re-encryption device comprising a storage device and the processor, the data sharing device also being a device that stores a conversion key generated from a first private key corresponding to the first public key and a second private key of the first user device, converts the first encrypted data into second encrypted data with the conversion key, and stores the second encrypted data, and the processing comprising:

writing, in the storage device, a first re-encryption key for re-encrypting the first encrypted data without decrypting to obtain first re-encrypted data decryptable with a private key of a second user device;

writing the conversion key in the storage device;

converting the first re-encryption key into a second re-encryption key with the conversion key in the storage device; and writing the second re-encryption key in the storage device, wherein the second encrypted data is identical to encrypted data obtained by encrypting the plain text data with a second public key corresponding to the second private key, and the second re-encryption key is a re-encryption key for re-encrypting the second encrypted data without decrypting to obtain second re-encrypted data decryptable with the private key of the second user device.

6. A non-transitory computer readable storage medium storing a program to cause a processor to perform processing, the program which is used by a data sharing device configured to communicate with a re-encryption device, the data sharing device comprising a storage device and the processor, the processing comprising:

writing, in the storage device, first encrypted data obtained by encrypting plain text data with a first public key of a first user device in the storage device;

writing a conversion key generated from a first private key corresponding to the first public key and a second private key of the first user device in the storage device;

converting the first encrypted data into second encrypted data with the conversion key; and writing the second encrypted data in the storage device, wherein the re-encryption device is configured to store a first re-encryption key for re-encrypting the first encrypted data without decrypting and obtaining first re-encrypted data decryptable with a private key of a second user device, store the conversion key, convert the first re-encryption key into a second re-encryption key with the conversion key, and store the second re-encryption key, the second encrypted data is identical to encrypted data obtained by encrypting the plain text data with a second public key corresponding to the second private key, and the second re-encryption key is a re-encryption key for re-encrypting the second encrypted data without decrypting to obtain second re-encrypted data decryptable with the private key of the second user device.

* * * * *